United States Patent
Lupa et al.

(10) Patent No.: US 9,004,900 B2
(45) Date of Patent: Apr. 14, 2015

(54) MATERIAL FORMING APPARATUS

(71) Applicants: Donald S. Lupa, North Aurora, IL (US);
Steve B. Torre, Rockford, IL (US)

(72) Inventors: Donald S. Lupa, North Aurora, IL (US);
Steve B. Torre, Rockford, IL (US)

(73) Assignee: SD Machinery, LLC, North Aurora, IL (US)

( * ) Notice: Subject to any disclaimer, the term of this patent is extended or adjusted under 35 U.S.C. 154(b) by 276 days.

(21) Appl. No.: 13/621,636

(22) Filed: Sep. 17, 2012

(65) Prior Publication Data
US 2013/0071506 A1 Mar. 21, 2013

Related U.S. Application Data

(60) Provisional application No. 61/536,391, filed on Sep. 19, 2011.

(51) Int. Cl.
*B29C 53/04* (2006.01)
*B27H 1/00* (2006.01)

(52) U.S. Cl.
CPC .. *B27H 1/00* (2013.01); *B29C 53/04* (2013.01)

(58) Field of Classification Search
CPC .................................. B27H 1/00; B29C 53/04
USPC ........... 144/256.1, 256.2, 262, 267–271, 255, 144/381; 425/169, 193, 194, 328, 374, 411; 264/285, 294, 339
See application file for complete search history.

(56) References Cited

U.S. PATENT DOCUMENTS

| | | | |
|---|---|---|---|
| 4,886,568 A * | 12/1989 | Strozier | 156/443 |
| 5,199,475 A * | 4/1993 | Koeder | 144/256.1 |
| 6,151,938 A | 11/2000 | Park | |
| 2008/0295556 A1 | 12/2008 | Hodgson | |

FOREIGN PATENT DOCUMENTS

| | | |
|---|---|---|
| RU | 2133163 | 7/1999 |
| RU | 2274786 | 4/2006 |
| RU | 2399450 | 5/2006 |
| SU | 1147471 | 3/1985 |

OTHER PUBLICATIONS

Patent Cooperation Treaty, International Searching Authority, Notification of Transmittal of the International Search Report and the Written Opinion of the International Searching Authority, or the Declaration, Corresponding to International Application No. PCT/US2013/060223, Feb. 13, 2014, 7 pp.

* cited by examiner

*Primary Examiner* — Dimple Bodawala
*Assistant Examiner* — Robert J Grun
(74) *Attorney, Agent, or Firm* — Fitch, Even, Tabin & Flannery LLP

(57) ABSTRACT

The present invention is a material forming apparatus that includes a piece of material that is a piece of laminated wood, a cover sheet made of plastic material, a flexible bed, a plurality of bed arms and a plurality of drive gears. The material forming apparatus also includes a numerical digital display, a plurality of roller clamps, one or more cranks with a grasping knob and a plurality of pivoting arms that are rotated by rotation of the drive gears and move the bed arms to force the flexible bed and the piece of material into a desired arc radius.

20 Claims, 6 Drawing Sheets

MATERIAL FORMING APPARATUS

This application claims priority to U.S. Provisional Application 61/536,391 filed on Sep. 19, 2011, the entire disclosure of which is incorporated by reference.

TECHNICAL FIELD & BACKGROUND

Traditional material forming apparatuses are limited in that they can often form only one fixed radius fixture at a time to form a material into a specific radius shape.

It is an object of the invention to provide a material forming apparatus that can be dialed into a plurality of unlimited radii to provide a platform to form one or more various materials into a specific radius shape.

It is an object of the invention to provide a material forming apparatus that saves time and money by eliminating a need to build a plurality of fixed radius fixtures that only work for a specific shape.

It is an object of the invention to provide a material forming apparatus that can be used to form wood for curved moldings, panels and other suitable wood products, but is not limited to any other material that uses one or more fixed molding forms through the use of one or more fixtures and clamps.

It is an object of the invention to provide a material forming apparatus that can be used to thermoform plastics and acrylics to a desired radius by providing a forming platform after being heated to a specified temperature.

What is really needed is a material forming apparatus that saves time and money by eliminating a need to build a plurality of fixed radius fixtures that only work for a specific shape that saves time and money by eliminating a need to build a plurality of fixed radius fixtures that only work for a specific shape that can be used to form wood for curved moldings, panels and other suitable wood products, but is not limited to any other material that uses fixed one or more molding forms through the use of one or more fixtures and clamps that can be used to thermoform plastics and acrylics to a desired radius by providing a forming platform after being heated to a specified temperature.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention. However, the order of description should not be construed as to imply that these operations are necessarily order dependent. In particular, these operations need not be performed in the order of presentation.

The phrase "in one embodiment" is used repeatedly. The phrase generally does not refer to the same embodiment, however, it may. The terms "comprising", "having" and "including" are synonymous, unless the context dictates otherwise.

Figure 1:
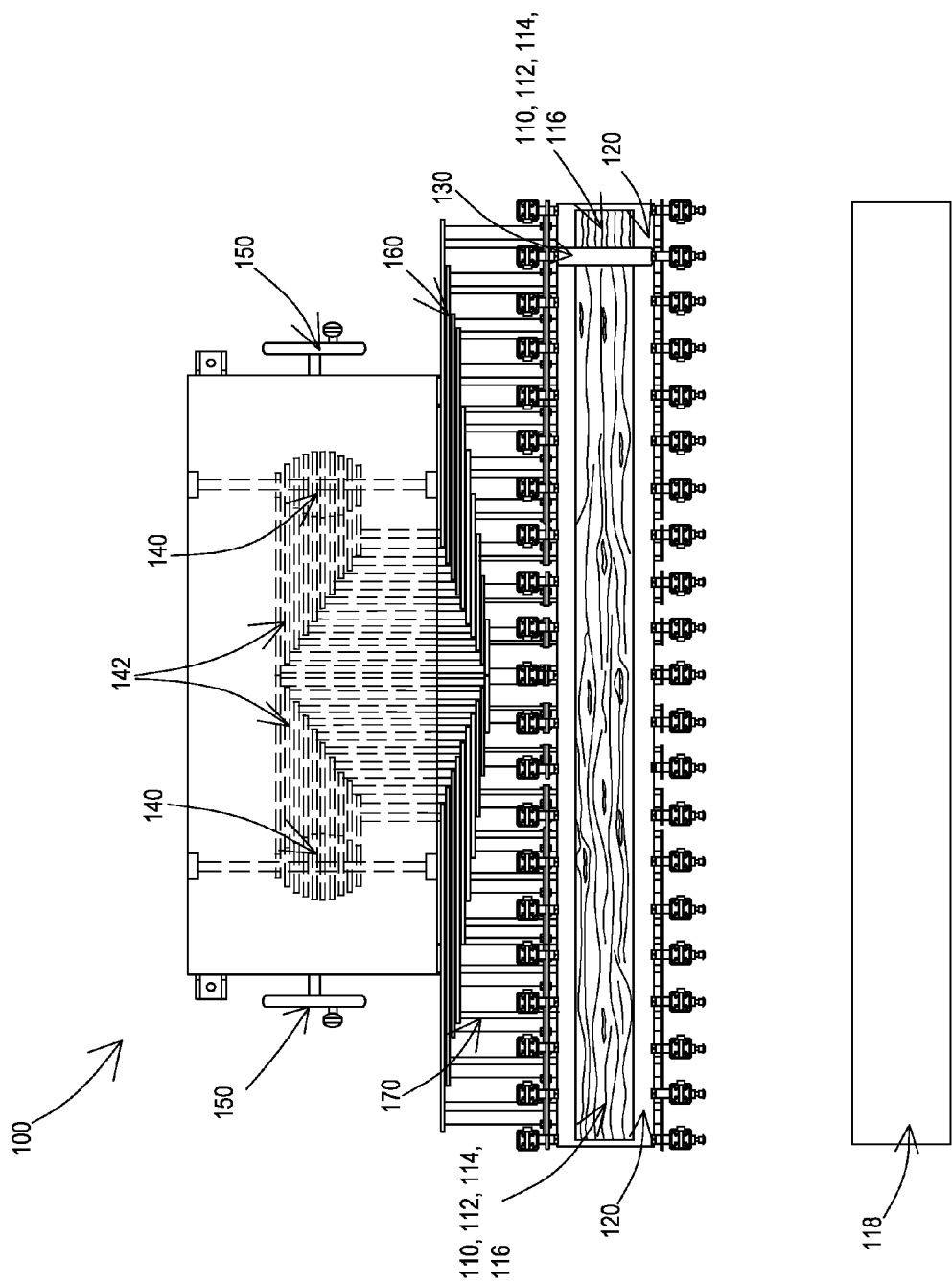
FIG. 1 illustrates a top plan view of a material forming apparatus, in accordance with one embodiment of the present invention.

FIG. 1 illustrates a top view of a material forming apparatus 100, in accordance with one embodiment of the present invention.

The material forming apparatus 100 includes a piece of material 110, a flexible bed 120, a plurality of roller clamps 130, a plurality of drive gears 140, one or more cranks 150, a plurality of pivoting arms 160 and a plurality of bed arms 170. The piece of material 110 can include a piece of laminated wood 112, a piece of thermoform plastic 114, a piece of acrylic 116 or other suitable material. A cover sheet 118 made of plastic material or other suitable material that is approximately in the range of ⅛ th of an inch to ¼ th of an inch in thickness is placed over the piece of material 110 to provide protection to the piece of material 110. The flexible bed 120 receives the piece of material 110 that is removably placed on the flexible bed 120 to be shaped. The flexible bed 120 is typically made of plastic but can be made of any suitable material. The flexible bed 120 is approximately ¼ inch in thickness although the flexible bed 120 can be any suitable thickness. The roller clamps 130 are positioned above the piece of material 110 and the flexible bed 120 to assist shaping the piece of material 110. Additional details regarding the roller clamps 130 are described in subsequent FIGS. 2B, 3, and 5. The drive gears 140 are rotated to assist shaping the piece of material 110. Additional details regarding the drive gears 140 are described in subsequent FIGS. 2A, 2B and 4. The one or more cranks 150 is rotated to provide power to rotate the drive gears 140. The one or more cranks 150 can be one or more manual cranks 152 or one or more motorized cranks 154. The pivoting arms 160 are rotated by the rotation of the drive gears 140 and move the roller clamps 130 to force the flexible bed 120 and the piece of material 110 downward to form a reducing, concentric arc radius. Additional details regarding the pivoting arms 160 are described in subsequent FIGS. 2B, 3, 4 and 5. The plurality of bed arms 170 receive the roller clamps 130 that are placed over the piece of material 110 by locking onto the bed arms 170.

Figure 2A:
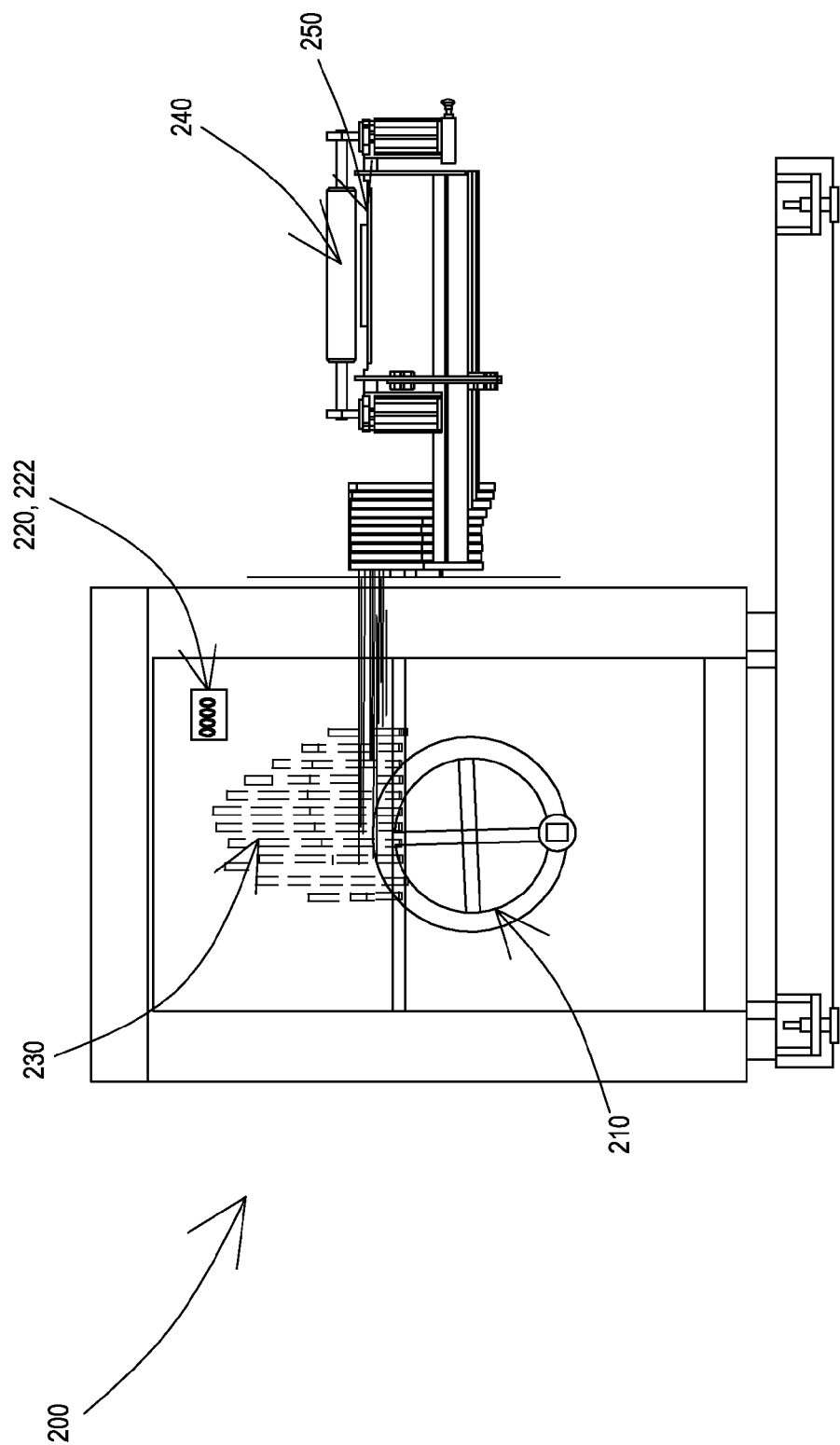
FIG. 2A illustrates a side elevation view of a material forming apparatus, in accordance with one embodiment of the present invention.

FIG. 2A illustrates a side view of a material forming apparatus 200, in accordance with one embodiment of the present invention. The material forming apparatus 200 illustrated in FIG. 2A is similar to the material forming apparatus 100 illustrated and described in FIG. 1 and its description. The material forming apparatus 200 illustrated in FIG. 2A includes one or more cranks 210, a numerical display 220, a plurality of drive gears 230, a roller clamp 240 and a piece of material 250. The one or more cranks 210, drive gears 230 and piece of material 250 are similar to the one or more cranks 150, the drive gears 140 and piece of material 110 illustrated and described in FIG. 1 and its description. The numerical display 220 is typically a digital display 222 that indicates when a desired predetermined length of a radius of the piece of material 250 is reached. The roller clamp 240 is placed over the piece of material 250 to assist shaping the piece of material 250. Additional details regarding the roller clamp 240 are described in subsequent FIGS. 2B and 3.

Figure 2B:
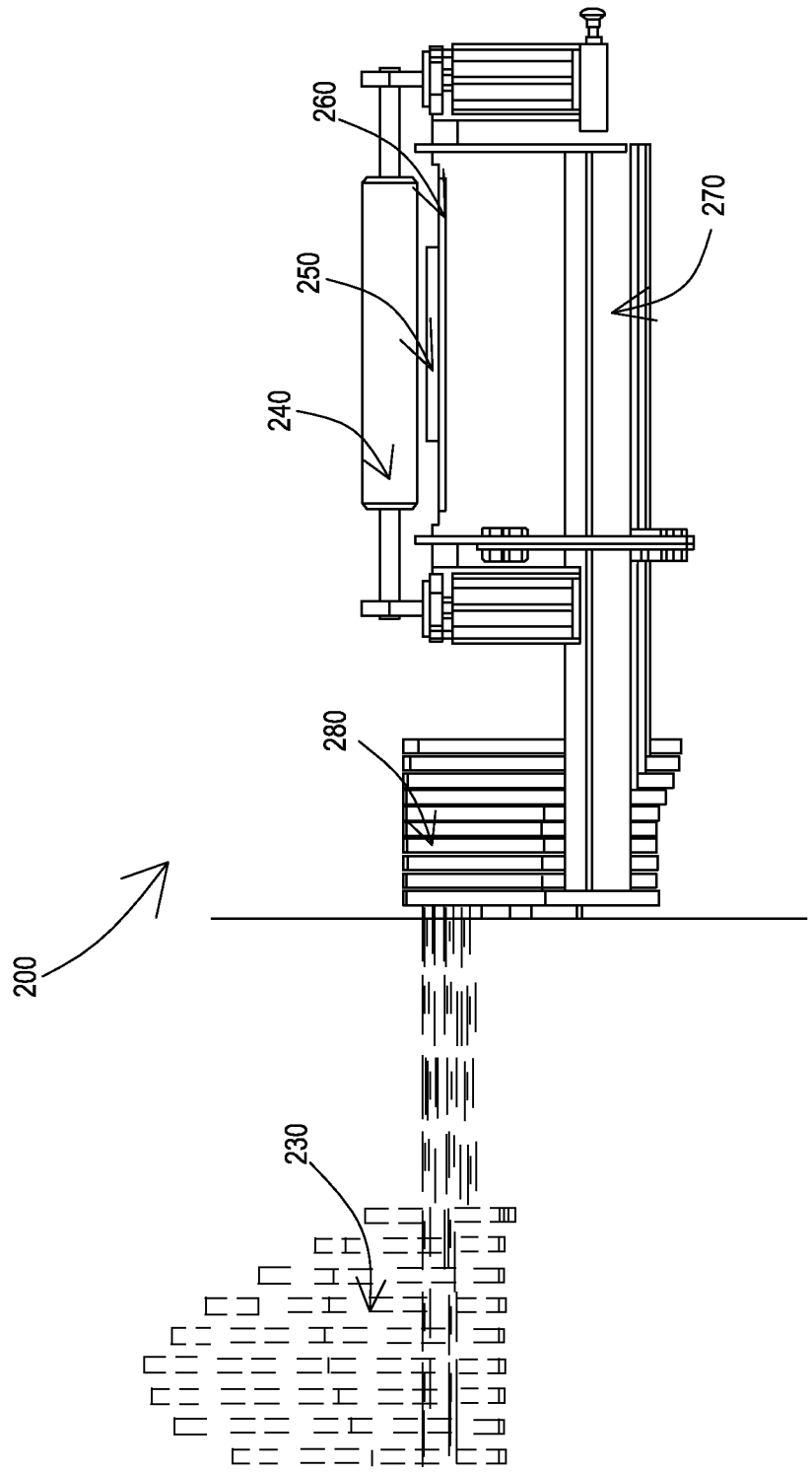
FIG. 2B illustrates an enlarged side elevation view of the roller clamp of the material forming apparatus of FIG. 2A.

FIG. 2B illustrates an enlarged side elevation view of roller clamp 240 of the material forming apparatus 200 of FIG. 2A, in accordance with one aspect of the present invention.

The material forming apparatus 200 illustrated and described in FIG. 2B is similar to the material forming apparatus 100 described in FIG. 1 and its description. The material forming apparatus 200 illustrated and described in FIG. 2B includes the piece of material 250, the flexible bed 260, the roller clamp 240, the plurality of bed arms 270, the drive gears 230 and the plurality of pivoting arms 280 that are similar to the piece of material 110, the flexible bed 120, the plurality of roller clamps 130, the plurality of bed arms 170, and the plurality of pivoting arms 160 that are described and illustrated in FIG. 1 and its description.

Figure 3:
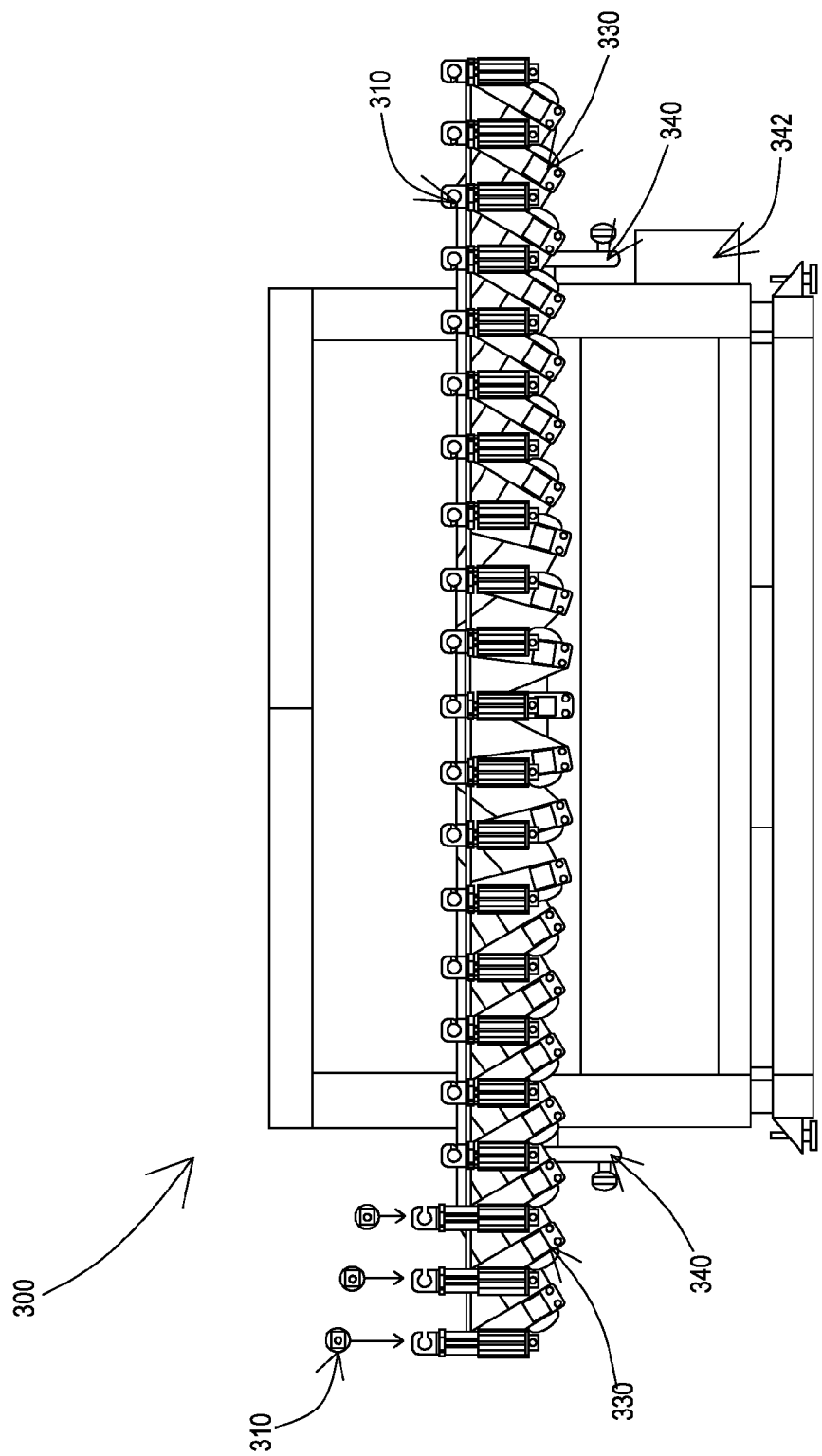
FIG. 3 illustrates a front elevation view of a material forming apparatus, in accordance with one embodiment of the present invention.

FIG. 3 illustrates a front view of a material forming apparatus 300, in accordance with one embodiment of the present invention.

The material forming apparatus 300 described and illustrated in FIG. 3 is similar to the material forming apparatus 100, 200 illustrated and described in FIGS. 1, 2A and 2B. The material forming apparatus 300 includes a plurality of roller clamps 310, a plurality of pivoting arms 330 and one or more cranks 340. The roller clamps 310, the pivoting arms 330 and the one or more cranks 340 illustrated and described in FIG. 3 are similar to the roller clamps 240, the pivoting arms 280 and the one or more cranks 210 illustrated and described in FIGS. 2A and 2B. The roller clamps 310 are placed over the piece of material (FIG. 2B, 250) by locking onto the bed arms (FIG. 2B, 270). The roller clamps 310 are closed down loosely to make contact with the piece of material 250. The drive gears 230 are rotated simultaneously by the one or more cranks 340 or a suitable motor 342, initiating rotation of each pivoting arm 330 independent of each other, at the rotation rate determined by a gear-ratio of each pivoting arm 330. The pivoting arms 330 move the bed arm 270 and the roller-clamp 310 forcing the flexible bed (FIG. 2B, 260) into an arc and the piece of material 250 to form a reducing, concentric, arc radius. The operator stops the rotation when the desired predetermined radius length is reached, indicated on the numerical display (FIG. 2A, 222). The roller clamps 310 are tightened down to hold the piece of material 250 together until a glue utilized to secure the piece of material 250 together dries or the piece of material 250 cools. The roller clamps 310 can be removed along with the newly formed piece of material 250 and the material forming apparatus 300 is ready to form a new part.

Figure 4:
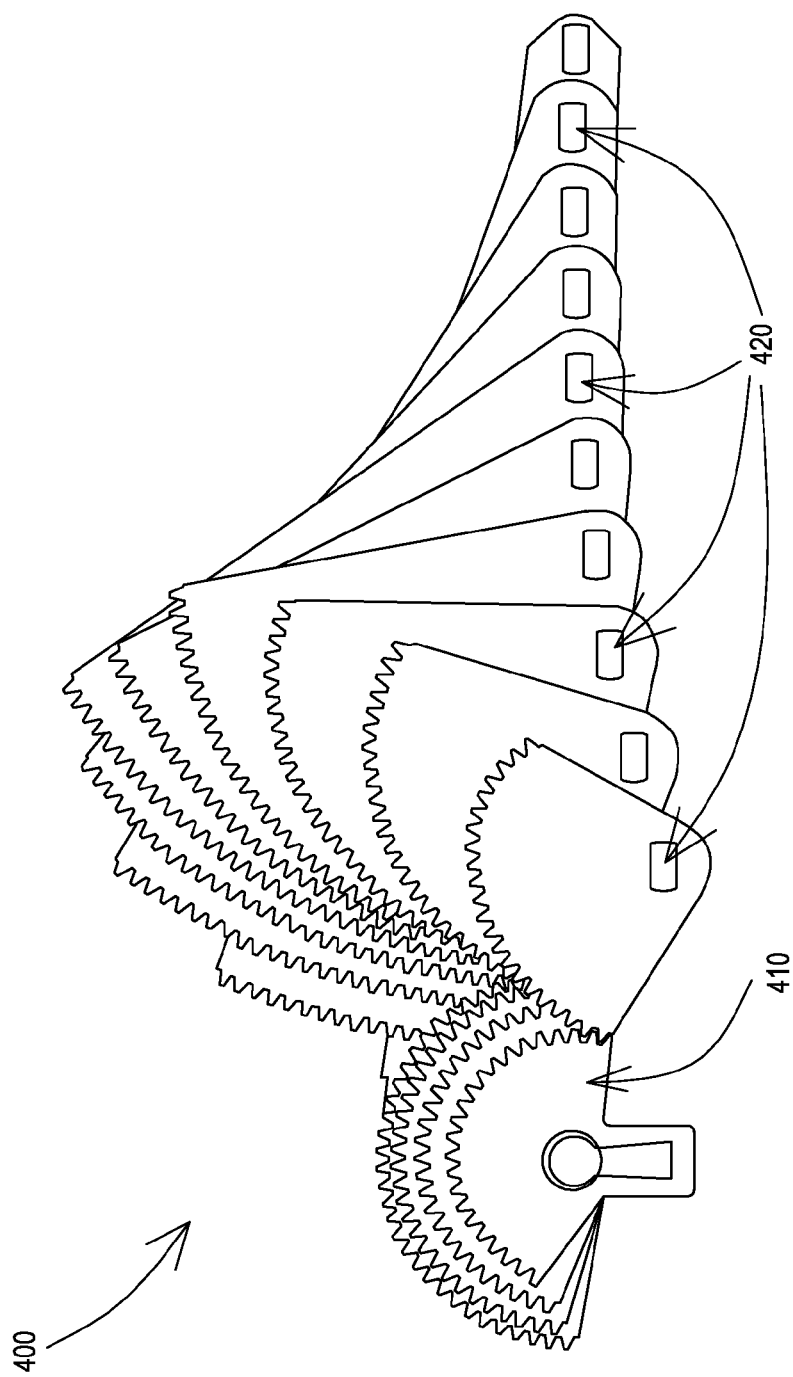
FIG. 4 illustrates a front elevation view of a plurality of drive gears and a plurality of driven gears, in accordance with one embodiment of the present invention.

FIG. 4 illustrates a front elevation view of a plurality of drive gears 410 and a plurality of driven gears 420 of a material forming apparatus 400, in accordance with one embodiment of the present invention.

The plurality of drive gears 410 and the plurality of driven gears 420 illustrated and described in FIG. 4 are similar to the plurality of drive gears 140 and 230 illustrated and described in FIGS. 1 and 2B. The plurality of drive gears 410 rotate and are engaged with the driven gears 420 and rotate the driven gears 420 and pivoting arms as previously illustrated and described with respect to drive gears 140 and pivoting arms 160 in FIG. 1 and its description.

Figure 5:
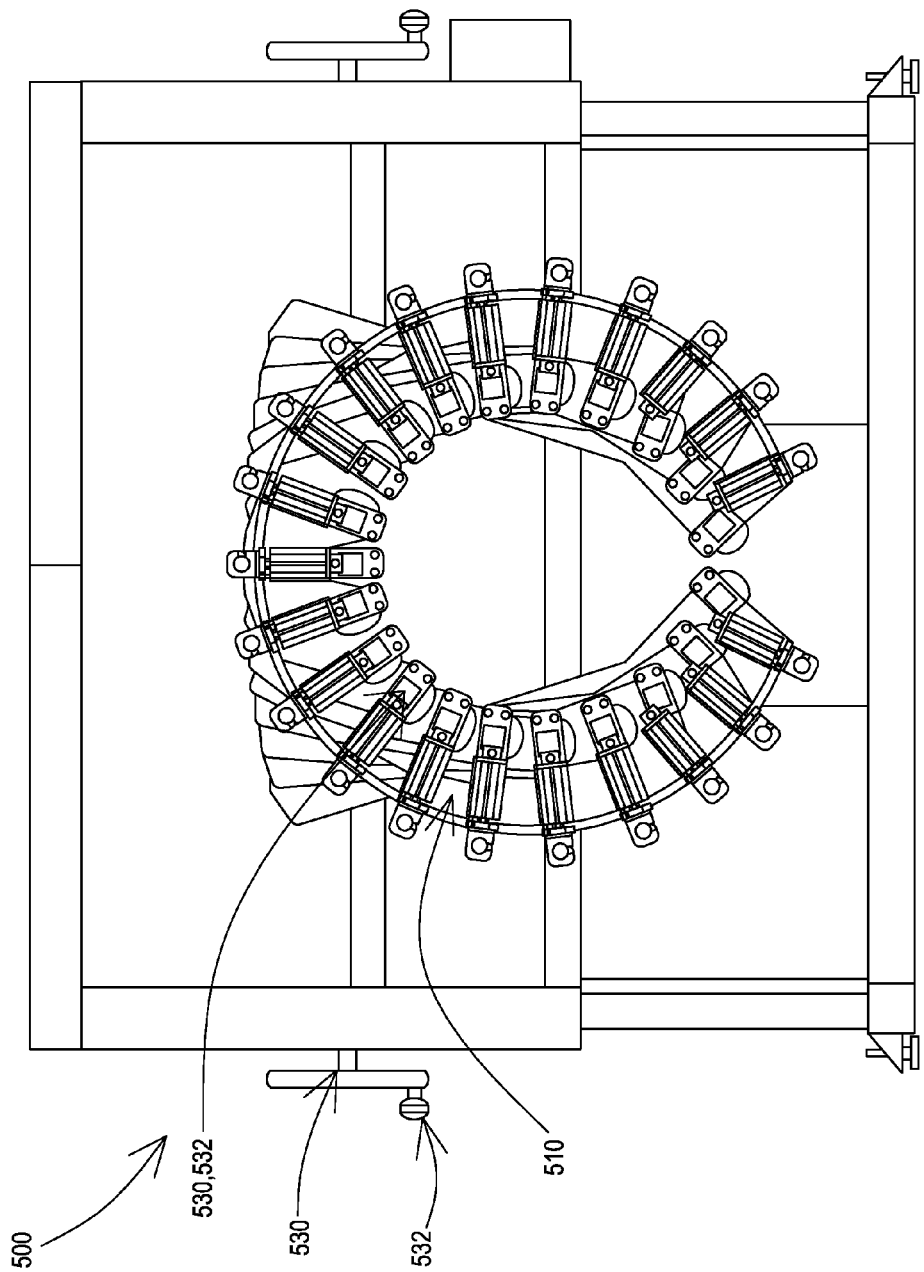
FIG. 5 illustrates a front elevation view of a plurality of pivoting arms, a plurality of pneumatic clamps and one or more cranks of a material forming apparatus in use, in accordance with one embodiment of the present invention.

FIG. 5 illustrates a front perspective view of a plurality of pivoting arms 510, a plurality of pneumatic clamps 520 and one or more cranks 530 of a material forming apparatus 500 in use, in accordance with one embodiment of the present invention.

The plurality of pivoting arms 510 and the one or more cranks 530 of the material forming apparatus 500 illustrated and described in FIG. 5 are similar to the plurality of pivoting arms 330 and one or more cranks 340 of material forming apparatus 300 illustrated and described in FIG. 3 and its description. The pneumatic clamps 520 are similar to the roller clamps 310 illustrated and described in FIG. 3 except that the roller clamps 520 illustrated and described in FIG. 5 and its description are pneumatic roller clamps 522. The one or more cranks 530 illustrated and described in FIG. 5 also have a grasping knob 532.

While the present invention has been related in terms of the foregoing embodiments, those skilled in the art will recognize that the invention is not limited to the embodiments described. The present invention can be practiced with modification and alteration within the spirit and scope of the appended claims. Thus, the description is to be regarded as illustrative instead of restrictive on the present invention.

What is claimed is:

1. A material forming apparatus, comprising: a flexible bed that receives a piece of material that is removably placed on the flexible bed to be shaped; a plurality of roller clamps that are positioned above the piece of material and the flexible bed to assist shaping the piece of material; a plurality of drive gears that are rotated to assist shaping the piece of material; a plurality of driven gears that are engaged with and rotate the drive gears; a numerical display that indicates when a desired length of a radius of the piece of material is reached; a plurality of roller clamps which are placed over the piece of material to assist shaping the piece of material; a plurality of bed arms that receive the roller clamps, the roller clamps are placed over the piece of material to lock the piece of material onto the bed arms; a plurality of pivoting arms that move the bed arms to force the flexible bed and the piece of material into an arc; and one or more cranks that are rotated to provide power to rotate the pivoting arms.

2. The material forming apparatus, according to claim 1, further comprising a cover sheet that is placed over the piece of material to provide protection to the piece of material.

3. The material forming apparatus, according to claim 2, wherein the cover sheet is approximately in the range of $\frac{1}{8}^{th}$ of an inch to $\frac{1}{4}^{th}$ of an inch in thickness.

4. The material forming apparatus, according to claim 1, wherein the drive gears are rotated simultaneously by the one or more cranks which are manual cranks and which initiate rotation of each pivoting arm independent of each other, at a rotation rate determined by a gear-ratio of each pivoting arm.

5. The material forming apparatus, according to claim 1, wherein the drive gears are rotated simultaneously by the one or more cranks which are motorized cranks and which initiate rotation of each pivoting arm independent of each other, at a rotation rate determined by a gear-ratio of each pivoting arm.

6. The material forming apparatus, according to claim 1, wherein the drive gears are rotated simultaneously by a motor initiating rotation of each pivoting arm independent of each other, at a rotation rate determined by a gear-ratio of each pivoting arm.

7. The material forming apparatus, according to claim 1, wherein the numerical display is a digital display.

8. The material forming apparatus, according to claim 1, wherein the roller clamps are placed over the piece of material by locking onto the bed arms.

9. The material forming apparatus, according to claim 1, wherein the roller clamps are tightened down to hold the piece of material together until a glue utilized to secure the piece of material together dries or the piece of material cools.

10. The material forming apparatus, according to claim 1, wherein the one or more cranks have a grasping knob.

11. A material forming apparatus, comprising: a piece of material that is a piece of laminated wood; a cover sheet made of plastic material that is placed over the piece of material to provide protection to the piece of material; a flexible bed that receives the piece of material that is removably placed on the flexible bed to be shaped; a plurality of roller clamps that are positioned above the piece of material and the flexible bed to assist shaping the piece of material; a plurality of drive gears that are rotated to assist shaping the piece of material; a plurality of driven gears that are engaged with and rotate the drive gears; a numerical display that indicates when a desired length of a radius of the piece of material is reached; a plurality of roller clamps are placed over the piece of material to assist shaping the piece of material; one or more cranks with a grasping knob that are rotated to provide power to rotate the drive gears; a plurality of bed arms that receive the roller clamps, the roller clamps are placed over the piece of material to lock the piece of material onto the bed arms; and a plurality of pivoting arms that are rotated by rotation of the drive gears and move the bed arms to force the flexible bed and the piece of material downward.

12. The material forming apparatus, according to claim 11, wherein the plastic material is selected from one of: a piece of thermoform plastic and a piece of acrylic.

13. The material forming apparatus, according to claim 11, wherein the cover sheet is approximately in the range of $\frac{1}{8}^{th}$ of an inch to $\frac{1}{4}^{th}$ of an inch in thickness.

14. The material forming apparatus, according to claim 11, wherein the drive gears are rotated simultaneously by the one or more cranks which are manual cranks and which initiate rotation of each the pivoting arm independent of each other, at a rotation rate determined by a gear-ratio of each the pivoting arm.

15. The material forming apparatus, according to claim 11, wherein the drive gears are rotated simultaneously by the one or more cranks which are motorized cranks and which initiate rotation of each the pivoting arm independent of each other, at a rotation rate determined by a gear-ratio of each the pivoting arm.

16. The material forming apparatus, according to claim 11, wherein the drive gears are rotated simultaneously by a motor initiating rotation of each the pivoting arm independent of each other, at a rotation rate determined by a gear-ratio of each the pivoting arm.

17. The material forming apparatus, according to claim 11, wherein the roller clamps are placed over the piece of material by locking onto the bed arms.

18. The material forming apparatus, according to claim 11, wherein the roller clamps are tightened down to hold the piece of material together until a glue utilized to secure the piece of material together dries or the piece of material cools.

19. The material forming apparatus, according to claim 11, wherein the roller clamps are pneumatic clamps.

20. The material forming apparatus, according to claim 11, wherein the pivoting arms force the flexible bed and the piece of material into a reducing, concentric, arc radius.

\* \* \* \* \*